Nov. 4, 1952 G. B. KNÖS 2,616,981

CROSSBAR SWITCH FOR AUTOMATIC TELEPHONE SYSTEMS

Filed Feb. 12, 1949 4 Sheets-Sheet 1

INVENTOR.
GUNNAR BORGE KNOS.
BY Fred M Vogel
AGENT.

Nov. 4, 1952 G. B. KNÖS 2,616,981

CROSSBAR SWITCH FOR AUTOMATIC TELEPHONE SYSTEMS

Filed Feb. 12, 1949 4 Sheets-Sheet 2

INVENTOR.
GUNNAR BORGE KNOS.
BY Fred M Vogel
AGENT.

Nov. 4, 1952 G. B. KNÖS 2,616,981

CROSSBAR SWITCH FOR AUTOMATIC TELEPHONE SYSTEMS

Filed Feb. 12, 1949 4 Sheets-Sheet 3

INVENTOR.
GUNNAR BORGE KNOS.
BY Fred M Vogel
AGENT.

Nov. 4, 1952 G. B. KNÖS 2,616,981

CROSSBAR SWITCH FOR AUTOMATIC TELEPHONE SYSTEMS

Filed Feb. 12, 1949 4 Sheets-Sheet 4

INVENTOR.
GUNNAR BORGE KNOS.
BY [signature]
AGENT.

Patented Nov. 4, 1952 2,616,981

UNITED STATES PATENT OFFICE 2,616,981

CROSSBAR SWITCH FOR AUTOMATIC TELEPHONE SYSTEMS

Gunnar Börge Knös, Eindhoven, Netherlands, assignor to Hartford National Bank and Trust Company, Hartford, Conn., as trustee Application February 12, 1949, Serial No. 76,157
In the Netherlands March 3, 1948

4 Claims. (Cl. 179—27.54)

With cross-bar switches for automatic telephone systems, of which the groups of elementary switches are constituted by sets of contact springs, it is conventional to use double contact points. This furthers the reliability of the switches and prevents the set of springs from becoming lopsided with closed contacts.

Cross-bar switches are known, in which the stationary contact bodies of the elementary switches consist of grids of parallel straight metal wires. These wires, over which the contact areas are evenly distributed, cooperate with rows of usually interconnected movable contact bodies. Relatively to the grids these rows extend in a direction at right angles to that of the stationary contact wires parallel to the grid. Such a cross-bar switch is, for example, described in now Patent Number 2,577,468, dated December 4, 1951, the copending application of the same inventor filed December 6, 1947, and given Serial Number 790,085. These cross-bar switches will be referred to hereinafter as cross-bar switches of the contact-wire type.

In the known cross-bar switches of this type the elementary switches formed by a stationary contact wire and a movable contact member, have only one contact point. However, by providing double contact wires similarly to the strings of a mandolin, it is possible to secure the advantage offered by a double contact.

The invention relates to cross-bar switches of the contact-wire type having double stationary contact wires. It relates to a construction of the said switches such that the presence of double stationary contact wires has an additional merit over the aforesaid advantage.

With the cross-bar switch according to the invention one or more grids of stationary contact wires associated with the same pair are insulated from one another and separately provided with a connection for a supply conductor. This has the advantage that the contact wires may be included in an electric circuit which is adapted to be closed by contact between the movable contact member and the two wires, the current flowing from one wire through the movable contact member to the other wire.

One of these uses consists in that with a grid, of which the fixed contact wires of one pair are insulated from one another, these wires are each connected to one end of the coil of the associated bar relay, so that this coil is short-circuited, and the relay is consequently de-energized, when one of the bridges of the cross-bar switch engages the channel associated with this relay.

In a further use the wires are included in the energizing circuit of a relay which controls a switch having a rest contact and shunting the coil of the bar relay of the next following channel, to ensure that the channels are engaged in the correct order.

According to the invention the insulated arrangement of the fixed contact wires may furthermore be used to close a circuit when all the channels of one cross-bar switch are engaged.

For this purpose, in a grid, of which the wires of the pairs of fixed contact wires are insulated from one another, each wire, except the first and the last, is connected to one of the wires of the adjacent pair in such manner that, when all channels are engaged, even the outer fixed contact wires are electrically interconnected, that is to say through the other wires, the movable contact members and the connections between the pairs. This outer wire is provided with connections to form a circuit in such manner that the current in this circuit flows to one of the outer wires and away from the other if these wires are interconnected in the aforesaid manner. This circuit may, for example, serve to indicate by a signal that the cross-bar switch is engaged. It may furthermore be used in cross-bar switches serving as coupling switches between other cross-bar switches to which the subscribers may be connected, to block the channels of the last-mentioned switch which lead to the engaged coupling switch. Thus the connection is automatically passed through a channel connected to a coupling switch which has not yet been entirely engaged. This may be effected with the use of a relay, of which the switch shunts the coils of the bar relays of the channels to be locked and thus puts these relays out of action.

In order that the invention may be more clearly understood and readily carried into effect, it will now be described more fully with reference to the accompanying drawing, in which.

Figure 1:
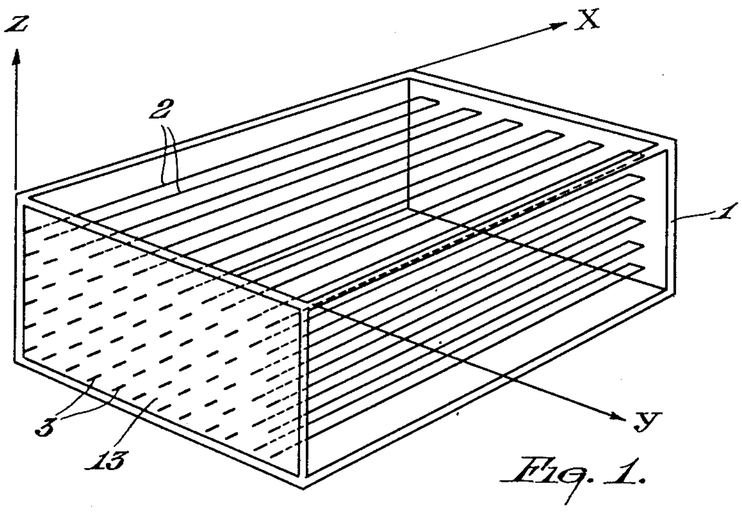
Fig. 1 is a perspective view of the position of the fixed contact wires in a cross-bar switch of the contact-wire type.

Referring to Fig. 1, reference numeral 1 designates a cabinet or frame in which the cross-bar switch is housed. This cabinet is shaped as a rectangular parallelepiped. The co-ordinate directions of the edges are designated X, Y and Z. For the sake of simplicity the latter will be assumed to be vertical, but the cabinet may, of course alternatively, be given a different position.

The stationary contact wires 2 extend in the direction X; they are arranged pairwise and constitute six superposed horizontal grids. The six pairs of superposed fixed contact wires are associated with the same channel. Their number may be greater or smaller in accordance with the number of wires of which each channel is composed. There are wires carrying voice current, others serve for signalling, routining and switching purposes. Supply conductors may be connected to the ends 3 projecting from the wall 1.

In each grid are shown six pairs of fixed contact wires. The movable contact bodies are not shown in Fig. 1. They are arranged in rows in the direction Y opposite each grid. In each of these rows they may be interconnected.

In Fig. 2 the cabinet is again designated 1, the fixed contact wires being designated 2. The pairs of wires 2, of which only two out of six are shown, are supported by partitions 4. One contact area is located between each pair of partitions. The partitions consist of strips of insulating material extending in the direction X with gaps between them, wherein the movable contact bodies are arranged. The strips of the partitions 4 are interconnected by vertical combs 5 of the same material (for example synthetic resin).

The movable contact bodies likewise consist of metal wires, of which one is shown and designated 6. The wires 6 are bent in a meandering way. They exhibit bows 7 and 8 which alternate with one another. The bows 7 serve for the attachment to the combs 5, the bows 8 constituting the contact bodies proper. All superposed contact bows are associated with the same channel and are controlled by a common catch 9, also termed ladder. This ladder can be pulled downwards by a magnet 10 or a spring stretched by the latter with the result that the contact bows move elastically downwards, each of them contacting with a fixed contact wire 2. A block consisting of one row of groups of elementary switches that are closed and opened by means of one and the same electromagnet, the associated catches, the magnet and the movable member by means of which the movement of the armature is transmitted to the catches, is termed a bridge. The common magnet is termed a contact or bridge relay. The member through which the catches are coupled to the movable member of the bridge is termed "bar" and the relay controlling this member is termed "bar relay." A row of groups of elementary switches associated with the same bar relay is termed a row of bars.

In the cross-bar switch according to the above-identified copending application the fixed contact bodies of the bridges are interconnected, since they are constituted by the fixed contact wires. The lines are here connected to the rows of bars to which the movable contact bodies are multiple-connected.

Figure 2:
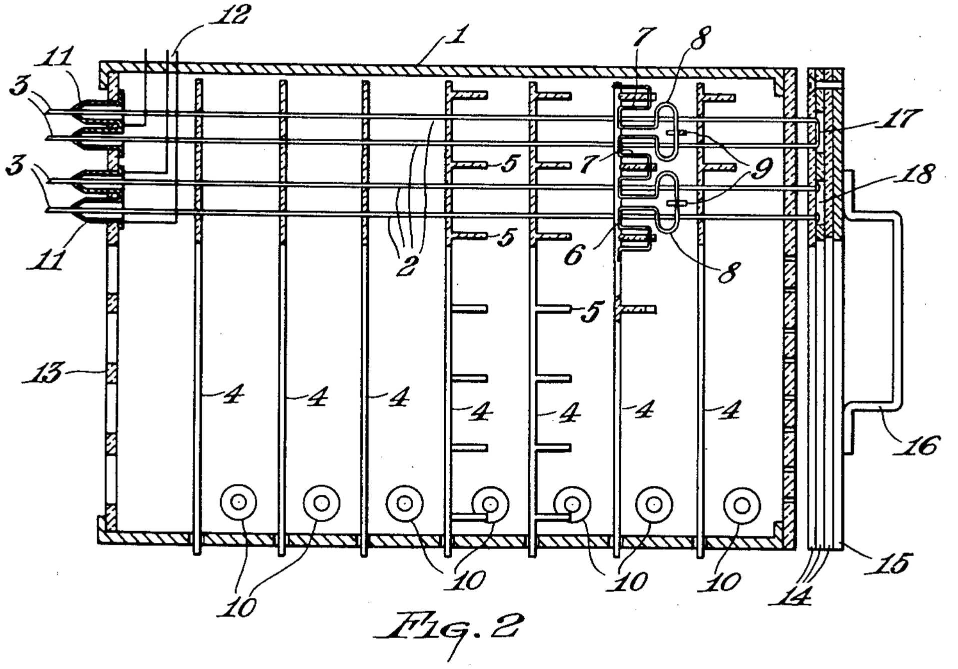
Fig. 2 is a diagrammatical sectional view of a cross-bar switch shown in Fig. 1 taken on a plane parallel with the grid.

In the cross-bar switch according to the invention and shown in Fig. 2 the fixed contact wires extend in the direction of the rows of bars and the movable contact bodies of the bridges are interconnected. Alternatively, however, a cross-bar switch in which the fixed contact wires extend in the direction of the bridges may be arranged in accordance with the invention.

It is furthermore assumed that in the embodiment described by way of example, the incoming lines are connected to the bridges. The rows of bars may have connected to them lines passing from the cross-bar switch into the telephone exchange. If a cross-bar switch is used to couple two other switches to one another, voice-current wires will, as a rule, not be connected to the stationary contact wires.

Usually the number of incoming lines (that is to say the number of bridges in the example described) exceeds the number of outgoing lines or coupling lines. The ratio between these numbers depends upon the rate of calling to be expected and upon the purpose for which the cross-bar switch is intended. The cross-bar switch according to the drawing comprises six rows of bars and seven bridges, but the latter number is, compared with the former, smaller than usual. Across this cross-bar switch at most six conversations are possible. By electro-magnetic locking provision is made that the elementary switches of each incoming line in one group only are closed.

The ends of the fixed contact wires 2 projecting on the left-hand side from the cabinet are introduced into contact bushes 11 to which supply wires 12 are secured. These bushes are shown in the wall 13 of the cabinet but, as an alternative, they may also be arranged in a separate contact cover.

The right-hand end of the fixed contact wires 2 is secured in a draw plate consisting of layers 14 of insulating material, for example pertinax, and a metal cover 15 provided with a handle 16. With the use of this draw plate all fixed contact wires can be drawn at a time out of the cabinet 1, if this is required for inspection or repairs.

On establishing a contact, each contact bow 8 rests on two fixed contact wires which may be interconnected on the side of the draw plate, as is shown at 17, thus constituting an assembly. According to the invention, however, the two wires of such a pair are insulated from one another in one or more grids, as shown at 18. To permit these wires also to be removed with the use of a draw plate, they are provided with a thickened part which cannot pass through the apertures provided in the first of the insulating plates 14. With these wires two separate contact bushes 11 each having a supply wire are provided at the free end. With the interconnected wires the contact bushes of the two wires of one pair may be integral with one another and have a single supply wire. This difference is shown in the drawing.

The significance of the various parts of the wiring diagram shown in Fig. 3 will appear hereinafter from the explanation of the operation of the system. The diagram which illustrates the system in its rest position, relates to a cross-bar switch, of which the grids each comprise four pairs of fixed contact wires. The diagram may, however, include any desired larger number of channels. This also applies to the bridges, of which the drawing shows only four.

The fixed contact bodies of four switches 19, 20, 21 and 22 are connected through a conductor 23 to one of the terminals (assumed to be the plus terminal) of a source of direct current (not shown). Each of these switches is associated with a bridge. Their movable contact bodies are connected to one of the supply conductors 24, 25, 26 and 27 of the coil of associated bridge relays 28, 29, 30 and 31. These relays are added to the sets of movable contact wires and designated 10 in Fig. 2. The other supply conductors 32, 33, 34 and 35 of the coils of the bridge relays may be connected, as will appear hereinafter, through switches 36, 37, 38 and 39 to the other terminal of the source of current, i. e., the negative terminal in the case concerned.

The movable contact bodies of the switches 19 to 22 are, moreover, connected to the movable contact bodies of switches 40, 41, 42 and 43, of which the stationary contact bodies are interconnected by a conductor 44.

The subscribers' sets are connected to the movable contact bodies of the cross-bar switch (wires 8 in Fig. 2) so that each of the switches 19 to 22 serves for one of these sets. When a subscriber wants to call and lifts his receiver, a relay (not shown) closes his switch. We assume this to be switch 19. The positive terminal of the current source is then connected by this switch to the conductor 24 and therefore, by way of switch 40 to the conductor 44, the current flowing through a condenser 45 and three switches 46, 47 and 48, the coil of an electromagnet 49, which is consequently excited, and then through a conductor 53 to the negative terminal of the current source.

While the condenser 45 is being charged, current also begins to flow through the coil of an electromagnet 54 which is connected in parallel with the condenser 45, so that it is also slowly excited.

The magnet 49 is the bar relay associated with the first set of fixed contact wires and therefore serves to couple the catches of the first row of bars to the driven members of the bridges. Apart from the bar relay 49, the wiring diagram shows three further bar relays 50, 51 and 52, but these are short-circuited by the switches 46, 47 and 48 and consequently out of action. Between the bar relays 49, 50 and between the bar relays 51 and 52 may be imagined further bar relays which are connected in the same manner. In a very practical embodiment, the cross-bar switch may, for example, comprise 10 channels and consequently ten bar relays.

In order to couple the movable member of the bridge relays with the catches the bars are actuated by a magnet 54, but in the rest position they are not coupled with the movable member of this magnet. For this purpose the companion bar relay 49, 50, 51 or 52 must first be energized. The arrangement is such that never two or more bar relays are energized at a time, so that never two or more bars are actuated at a time by magnet 54.

By energizing the bar relay 49, the bar cooperating with the first group of fixed contact wires (the first channel) is mechanically coupled with the movable member of magnet 54. Owing to the condenser 45 the bar relay 49 is energized prior to the driving magnet 54. First of all the bar which is controlled by the relay 49 is coupled to the movable member of magnet 54. If, subsequently, the latter relay is sufficiently energized, it urges the bar controlled by relay 49 into the position, in which it couples in turn the movable member of bridge relay 28 to the catch in the first channel.

The magnet 54 not only serves as a driving magnet, but it is, in addition, constructed to constitute a relay which controls a switch 55. The latter is included in a conductor 56 by which the negative terminal of the current source, with each of the switches 36 to 39, is connected to one of the change-over contact members, i. e. to that which, in the rest position of these switches, engages the movable contact member. By closing the switch 55, upon energisation of driving magnet 54, a circuit is closed from the positive terminal through switch 19, conductor 24, bridge relay coil 28, conductor 32, switch 36, conductor 56 and switch 55 to the negative terminal.

Figure 7:
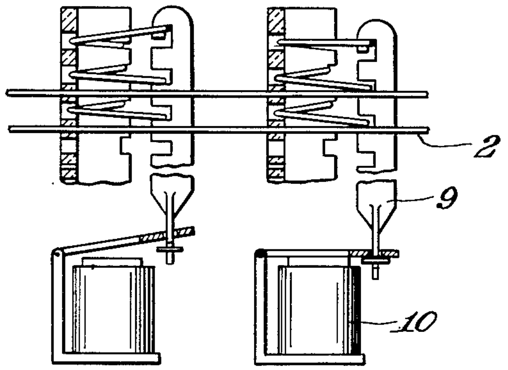
Fig. 7 illustrates the means for actuating the active contacts of the cross-bar switch to engage the passive contacts thereof.

The current flowing through this circuit energizes the bridge relay 28, which is enabled to actuate that catch 9 which is coupled by way of the bar controlled by relay 49, with the movable member of relay 28. The further catches associated with the same bridge are not coupled with a bar and thus remain in the rest position. Owing to the action of relay 28 the contact bows resting on the catch driven are brought into contact with the fixed contact wires 2 and the connection, in as much as it passes over the cross-bar switch, is established. This action is shown separately in Fig. 7, wherein the bridge relay is designated by numeral 10, as in Fig. 2, and wherein the bridge relay is coupled to catch 9 by means including the bar actuated by magnet 49, the operation of catch 9 drawing the active contact bows into engagement with the fixed contact wires 2.

The couplings between catch and movable member of the bridge relay are arranged to be such that they are not disconnected as long as the catch is attracted, even if the bar is again moved into its passive position. Consequently, the energizing current of the relays 49 and 54 may now be switched off. This is effected by the bridge relay 28, since the latter controls the switch 40. Owing to energization of relay 28 this switch is opened, so that the current energizing relay 54 is interrupted.

The fact that relay 54, after the condenser 45 has discharged across its coil, opens switch 55 may not result in that the energizing current of bridge relay 28 is interrupted, since in this case the telephone connection just established would be broken. In order to avoid the latter inconvenience provision is made of switches 36 to 39 which are controlled by the associated bridge relays. When the bridge relay 28 is energized, it does not only open switch 40 but also changes over the movable member of the contact body of switch 36. This is a switch having a continuous change over contact, that is to say that one contact is not broken before the movable contact body engages the second fixed contact body. By changing over this movable contact body, the conductor 32 is connected directly to the negative terminal of the supply. Owing to the opening of switch 55 the relay 28 does not become deenergized and the connection is broken only when the subscriber replaces the receiver, so that switch 19 is opened. Since, owing to the presence of the charged condenser 45, the relay 54 is deenergized with some delay, the connection between the conductor 32 and the negative terminal is established across switch 36 before switch 55 is opened by relay 54.

If a second subscriber of those connected to the switches 19 to 22 wants to engage in conversation, he must not be connected to the same channel of the cross-bar switch, but to an idle line. Therefore, bar relay 29 must not respond to the call of this second subscriber, but a further bar relay must respond. In order to satisfy this second condition use is made, according to the invention, of a grid of fixed contact wires of the cross-bar switch, the wires of each pair being insulated from one another. This grid is not used for conveying voice currents. One wire of the pair designated 57, 58 and 59 in the diagram is connected through a conductor 61, 62 or 63 (to be connected to the contact bushes 11 in Fig. 2) to one end of the coil of an auxiliary relay 64, 65 and 66, the other end of which is connected to conductor 23, i. e. to the positive terminal of the supply. Each bar relay, except the last, is associated with such an auxiliary relay.

The other wire of the pair 57 is connected to the negative end of the coil of the companion bar-relay. This also applies to the pairs of wires 58, 59 and 60, but with the latter the outer wire is not connected, since the channel of the pair 60 does not comprise an auxiliary relay. Consequently, this wire is here inoperative of course, this does not apply to the other pairs of wires of the same channel, particularly not to those through which the voice currents flow.

Consequently, excitation of coil 28 not only results in that the catch coupled with the bar controlled by relay 49 causes the contact bows conveying the voice current to engage the fixed contact wires, but also in that the contact bow 67 co-operating with the pair of fixed contact wires 57 closes the energisation circuit of the auxiliary relay 64. This auxiliary relay co-operates with switch 48 which up to now short-circuited the coil of bar relay 50 of the adjacent channel. Due to energization of the auxiliary relay 64 this switch is opened, so that the short-circuit of coil 50 is removed. Yet, this coil is not excited for, since the bridge relay 28 has opened the switch 40, the current previously passing over switch 48 is interrupted. Only is coil 50 released for the following conversation.

It is now assumed that a second subscriber, the set of which is connected to the bridge associated with bridge relay 30 lifts the receiver, thus closing the switch 21. Current then flows from the positive terminal of the source of current through conductor 23, switches 21 and 42, to condenser 45 and coil 54 and then through switches 46 and 47. From there the current flows through the coil of the bar relay 50, which is no longer short-circuited and which may now be used for the said second subscriber.

As stated this current must not energize, in addition, the bar relay 49. In order to avoid this the combination of one of the fixed contact wires 58 of the pair 57 and the associated movable contact body (contact bow 67) is used as a switch to short-circuit the bar relay 49 so that it is out of action. Thus the first of the two aforesaid conditions is satisfied.

It is obvious that, in this case, the movable contact bodies co-operating with the grid, of which wires 57 form part, will be interconnected in the bar direction X instead of Y, hence they cannot be constituted by movable contact wires extending in a transverse direction, as is the case with the movable contact bodies conveying voice current.

The second connection is now established similarly to the first.

In the same manner as described above, the other auxiliary relays 65 and 66 release the adjacent bar relays and the movable contact bodies 68, 69 and 70 lock the bar relays of the channel with which they are associated themselves.

Figure 4:
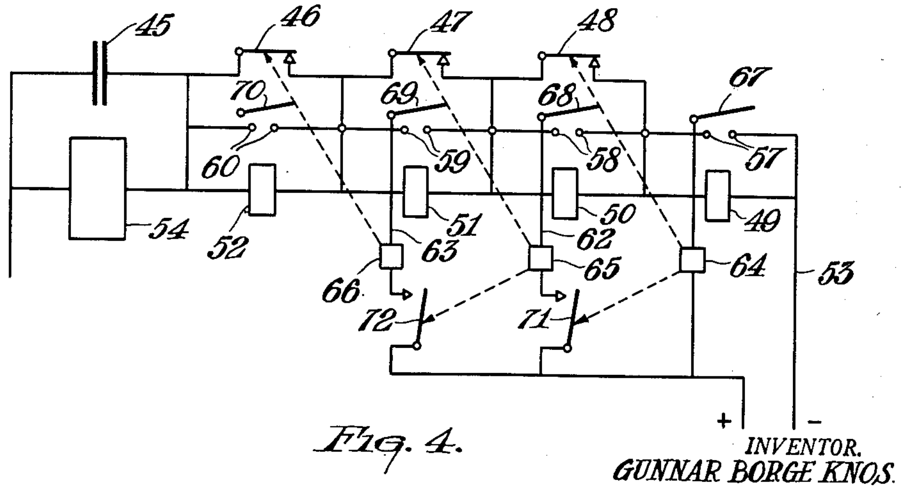
Fig. 4 is a slightly modified detail view of an arrangement shown in Fig. 3.

As an alternative, the wires 57 to 60 may both be connected to the ends of coils 49 to 52, and the movable contact bodies to the coils of the auxiliary relays. This is shown in Fig. 4.

When the connection established first is interrupted, the movable contact body 67 stands again free from the wires 57. The energizing current of the auxiliary relay 64 is cut off and switch 48 is closed again. However, the energizing current of the auxiliary relays 55 and 56 passes also over the movable contact body 67. Owing to the interruption of the contact between the movable contact body 67 and the wires 57, coil 49 might be connected in series with the coil of one of these auxiliary relays and even with two or more parallel-connected coils of these relays. In order to avoid this the energizing circuit of these relays includes a switch having a make contact 71, 72 and which is controlled, similarly to the shunting switches 46, 47 and 48, by the auxiliary relay of the preceding channel. Thus, the auxiliary relay 64 controles the switch 71 in the energizing circuit of the auxiliary delay 65 and this, in turn, controls the switch 72 in that of auxiliary relay 66. Consequently, when the first channel is released, the auxiliary relays of all the engaged channels are de-energized, same as auxiliary relay 64, and all the bar relay, but for bar relay 49, are locked. On the next following call the lattler will consequently again become operative.

Figure 5:
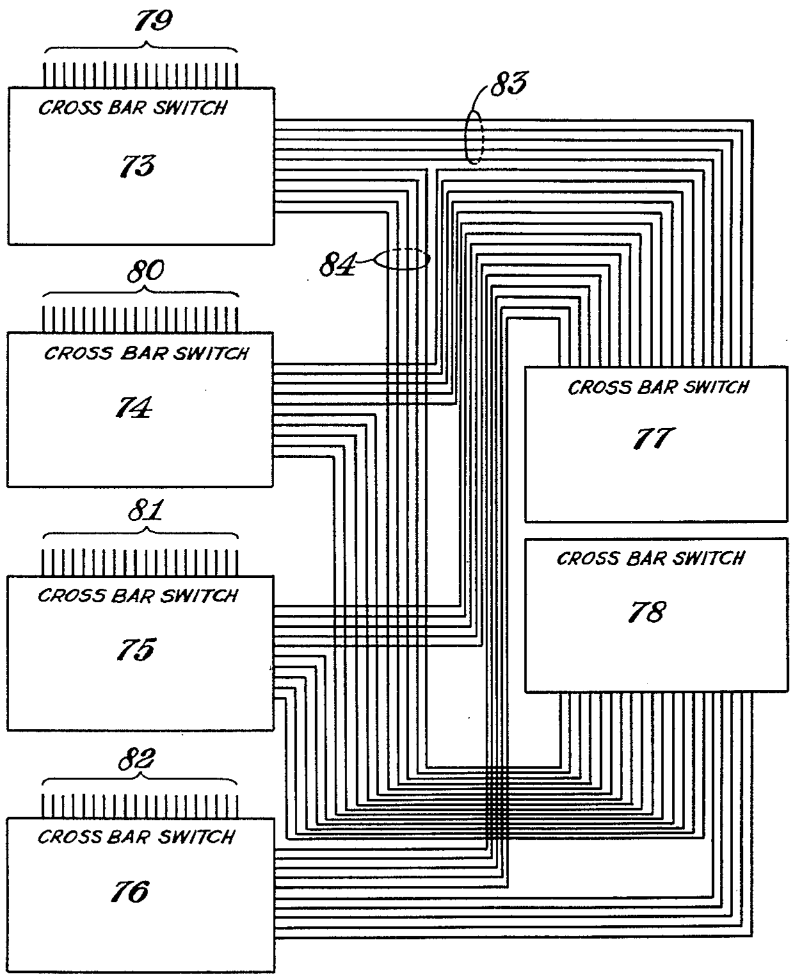
Fig. 5 illustrates how in a telephone exchange comprising a number of cross-bar switches, to the bridges of which the subscribers are connected, the channels of these cross-bar switches are connected to coupling switches.

Fig. 5 shows the wiring diagram of a system comprising four cross-bar switches 73, 74, 75 and 76, to each of which twenty subscribers are connected and each of which permits connection to ten lines. The interconnection between these lines passes over two further cross-bar switches 77 and 78, which will be termed as coupling switches in view of their function. The other switches will be termed subscriber switches. The outgoing lines of the subscriber switches are connected to the bridges of the coupling switches. The fixed contact wires of the coupling switches may have connected to them wires of signalling or routining systems, and in addition conductors conveying the direct current from the central supply to the voice channels. These fixed contact wires furthermore serve for the interconnection of the subscribers' sets.

To permit each of the 80 subscribers connected to be connected to any of the remaining 79 sets, one half of the outgoing lines of the subscriber switches is connected to coupling switch 77 and the other half to coupling switch 78.

Reference numerals 79, 80, 81 and 82 designate the groups of every 20 incoming lines of the subscriber switches, which are connected to the bridges of switches 73 to 76.

Of the cross-bar switch 73 one group 83 of five lines is connected to bridges of coupling switch 77, a second group 84 comprising the other five lines which are connected to coupling switch 78.

It may occur that the five lines of group 83 are not all engaged, but that coupling switch 77 is completely engaged by subscribers distributed among two or more of the other subscriber switches. When a subscriber connected to switch 73 would hunt for a connection, he would reach, through an idle channel of group 83, the engaged coupling switch 77, where he would not find there an idle bar relay, thus receiving the busy signal. The other coupling switch 78 is not completely engaged, but since in a system as shown in Fig. 3 invariably the first idle bar relay is chosen, the turn of the channels of group 84 does not come without using further expedients.

This may be improved with the use of the invention by causing one of the grids of fixed contact wires in crossbar switch 88 to lock the lines of group 83.

Figure 6:
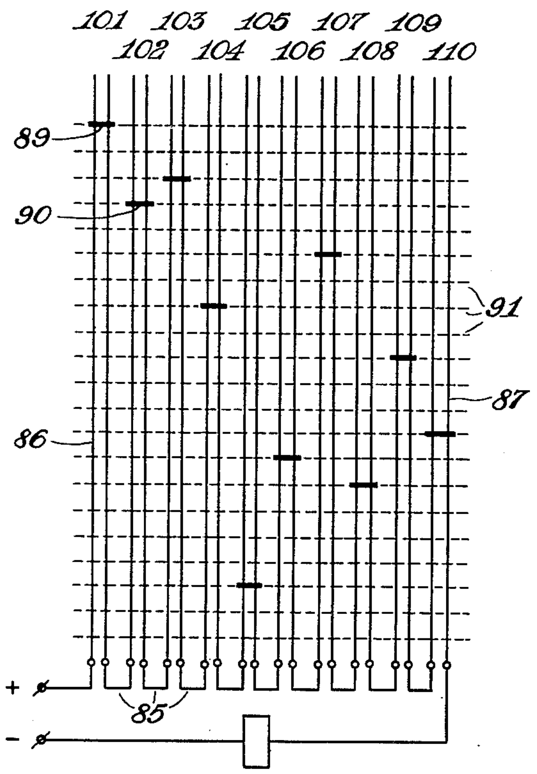
Fig. 6 illustrates how in such coupling switches use may be made of a grid according to the invention to lock the channels connected to the coupling switch when the latter is completely engaged.

Fig. 6 shows this grid. The pairs of fixed contact wires are designated 101 to 110. Through conductor 85 each wire is connected to a wire of the adjacent pair. One wire of pair 101 is thus connected to one wire of pair 102, the other wire of pair 102 being connected to one wire of pair 103 and so on. The first wire 86 of pair 101 and the last wire 87 of pair 110 are not connected to a wire of another pair. The former (86) is connected to one of the terminals of the central supply, for example to the positive terminal. Wire 87 is connected to one end of the coil of a relay 88, of which the other end is connected to the second terminal of the central supply.

As long as the coupling switch is not completely engaged the energizing circuit of relay 88 is not closed. In the figure, however, the switch is fully engaged, since each pair of fixed contact wires is engaged by a contact bow connecting the two wires of the pair. Thus, contact bow 89 connects the wire of pair 101, contact bow 90 in a further bridge connects the wires of pair 102 and so on. The twenty bridges are shown in broken lines 91.

Consequently, from one terminal of the central supply the energizing current of relay 88 passes through wire 86 to contact bow 89 and then through the second wire of pair 101 and the connection 85 between this wire to one wire of pair 102, over contact bow 90 and through the other wire of pair 102 and so forth through a greater or smaller part of all other fixed contact wires 103 to 110, finally reaching, through wire 87, the coil of relay 88. This relay controls a switch which blocks all the bar relays associated with the channels of group 83. This switch is not shown in Fig. 6. It may be constituted by the first shunting switch of group 84 i. e. in Fig. 3 switch 47. To this end, the latter is constructed as a switch having change over contacts. It comprises a second fixed contact body which is connected to the negative end of coil 49, as shown by broken lines 92 in Fig. 3. In this case, the bar relays 49 and 50 must consequently be considered to be those associated with group 83, and the bar relays 51 and 52 to be those associated with groups 84. The fact that in Fig. 3 only four channels instead of ten are shown does not make a fundamental difference from the system shown in Fig. 5. As stated, any desired number of bar relays may be added between the bar relays 49, 50 and between bar relays 51, 52.

Figure 3:
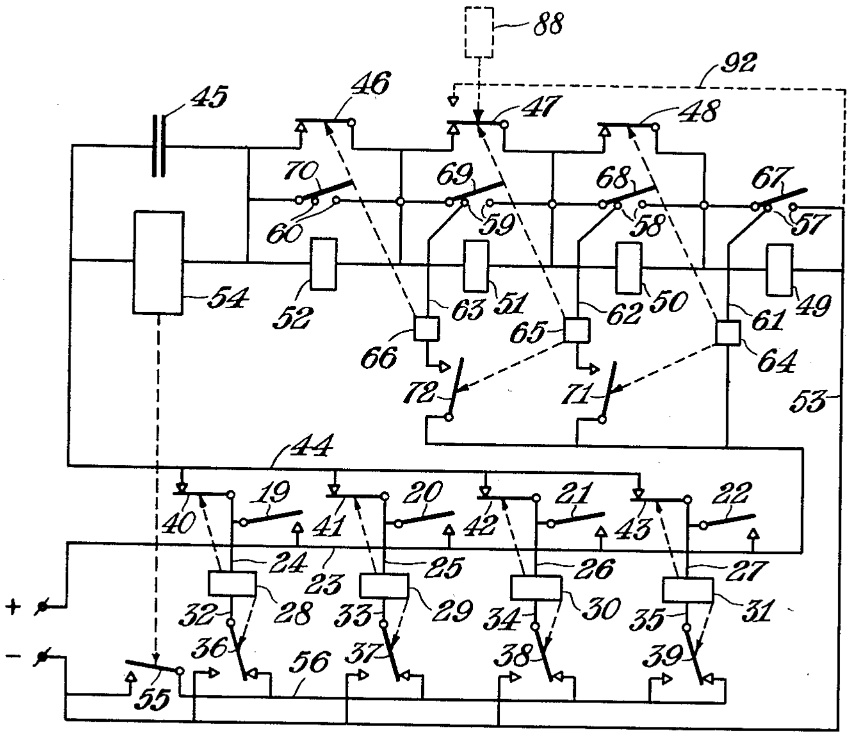
Fig. 3 is a diagram of one example of the circuit arrangement of a cross-bar switch according to the invention.

If switch 47 in Fig. 3 is changed over by relay 88 in Fig. 6, the bar relays 50 and 49 and any bar relays provided between them are locked. The current which is closed by a subscriber through one of the switches 19 to 22 will consequently pass direct over switch 47 and conductor 92 and will not excite one of the coils of the bar relays of channel 83.

In order that this current may energize one of the bar relays associated with a channel of group 84, the switch 47 is constructed as a switch having change over contacts. It is connected in such manner that in one position (rest position) it shunts coil 51, i. e. bar relay of group 84 and in its other position shunts coils 49 and 50 i. e. the bar relays of group 83. If switch 47 is changed over, either by energisation of relay 88 or by energisation of the auxiliary relay 65, a channel of coupling switch 78 is engaged upon the next following call. In this event, an idle bar relay in this channel is made operative in the same manner as explained with reference to the subscriber switch.

What has been said with respect to group 83 of switch 73 also applies to the group of the further subscriber switches connected to coupling switch 77. If one or two of these groups were accidentally engaged, the shunting of the coils of their bar relays has no further effect, since those were already short-circuited. Neither does it cause trouble, for if one of these channels is released, this means that the coupling switch 77 is no longer fully engaged, this removing also the shunting, by switch 47, of the coils of the bar relays associated with the group connected to this coupling switch.

The manner in which, in this event, the subscriber to be called is connected to the channel, will not be described, since it is irrelevant to the invention. This question is a problem which can be solved with the use of known systems of selectors and registers.

What I claim is:

1. A cross-bar switch for automatic telephony comprising a passive contact grid structure constituted by a group of paired conductors disposed in parallel relation in a common plane, the conductors of each pair being insulated from each other, a plurality of resilient wires disposed at spaced positions transversely with respect to said conductors, each of said wires being flexuously shaped to define a plurality of spaced bows, each bow forming an active contact intersecting a respective pair of said conductors, and means coupled to each active contact bow for effecting engagement thereof with the associated pair of conductors to interconnect same.

2. A cross-bar switch for automatic telephony comprising a passive contact grid structure constituted by a group of paired conductors disposed in parallel relation in a common plane, the conductors of each pair being insulated from each other, a plurality of resilient wires disposed at spaced positions transversely with respect to said conductors, each of said wires being flexuously shaped to define a plurality of spaced bows, each bow forming an active contact intersecting a respective pair of said conductors, and means coupled to each active contact bow for effecting engagement thereof with the associated pair of conductors to interconnect same, said last-named means including a selecting bar associated with each pair of conductors and extending in the direction thereof and an electromagnet for actuating said bar, the ends of said electromagnet being connected to the associated pair of conductors.

3. An arrangement, as set forth in claim 2, further including a relay having a break contact, an energy source for said relay coupled thereto through the passive contacts formed by said associated conductors, said break contact shunting the electromagnet related to the adjacent pair of conductors.

4. A cross-bar switch for automatic telephony comprising a passive contact grid structure constituted by a group of paired conductors disposed in parallel relation, the conductors of each pair being insulated from each other, each conductor of each pair being connected to one conductor of the adjacent pair, a plurality of resilient wires disposed at spaced positions transversely with respect to said conductors, each of said wires being flexuously shaped to define a plurality of spaced bows, each bow forming an active contact intersecting a respective pair of said conductors, and means coupled to each bow for effecting engagement thereof with the associated pair of conductors to interconnect same, said last-named means including a selecting bar associated with each pair of conductors and extending in the direction thereof and an electromagnet for actuating said bar, the ends of said electromagnet being connected to the associated pair of conductors.

GUNNAR BÖRGE KNÖS.

REFERENCES CITED

The following references are of record in the file of this patent:

UNITED STATES PATENTS

| Number | Name | Date |
|---|---|---|
| 2,137,514 | Voss | Nov. 22, 1938 |
| 2,341,029 | Field | Feb. 8, 1944 |
| 2,517,022 | Peek | Aug. 1, 1950 |
| 2,517,679 | Knos | Aug. 8, 1950 |